(12) United States Patent
Trosper

(10) Patent No.: US 6,459,376 B2
(45) Date of Patent: *Oct. 1, 2002

(54) RADIO FREQUENCY IDENTIFICATION DEVICES, REMOTE COMMUNICATION DEVICES, WIRELESS COMMUNICATION SYSTEMS, AND METHODS OF INDICATING OPERATION

(75) Inventor: Scott T. Trosper, Meridian, ID (US)

(73) Assignee: Micron Technology, Inc., Boise, ID (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/363,945

(22) Filed: Jul. 29, 1999

(51) Int. Cl.[7] .............................................. G08B 13/14

(52) U.S. Cl. .................... 340/571; 340/572.1; 340/10.1; 340/10.4; 340/10.42; 340/10.51; 340/5.81

(58) Field of Search ............................. 340/571, 572.1, 340/10.1, 10.2, 572.4, 572.8, 573.1, 539, 825.36, 825.44, 5.81, 10.4, 10.42, 825.72, 825.45, 10.51

(56) References Cited

U.S. PATENT DOCUMENTS

| | | | |
|---|---|---|---|
| 4,075,632 A | 2/1978 | Baldwin et al. | 343/6.8 R |
| 4,223,830 A | * 9/1980 | Walton | 235/380 |
| 4,236,068 A | * 11/1980 | Walton | 235/380 |
| 4,476,469 A | 10/1984 | Lander | 340/825.49 |
| 4,675,656 A | 6/1987 | Narcisse | 340/539 |
| 4,926,182 A | 5/1990 | Ohta et al. | 342/44 |
| 5,087,906 A | * 2/1992 | Eaton et al. | 340/311.1 |
| 5,113,183 A | 5/1992 | Mizuno et al. | 340/5.31 |

(List continued on next page.)

OTHER PUBLICATIONS

Copending Application's Claims 1–50 09/364,249 Trosper, Jul. 29, 1999.*
SN: 08/907,689, Wood, Jr. Original Application, filed Aug. 8, 1997; Amendment filed Aug. 4, 1998; Amendment filed Sep. 10, 1999; Amendment filed Feb. 27, 2001; Pending Claims.
SN: 09/363,944, Scott T. Trosper, Original Applications; filed Jul. 29, 1999; Amendment filed Aug. 16, 2000; Amendment filed Dec. 20, 2000; Amendment filed Feb. 5, 2001; CPA filed May 2, 2001; Pending Claims.
SN: 09/364,249, Scott T. Trosper, Original Application; filed Jul. 29, 1999, CPA filed Mar. 12, 2001; Pending Claims.
RFID; htp://www.aimglobal.org/technologies/rfidl; Mar. 9, 2001; pp. 1–2.

*Primary Examiner*—Daniel J. Wu
*Assistant Examiner*—Toan Pham
(74) *Attorney, Agent, or Firm*—Wells St. John, P.S.

(57) ABSTRACT

The present invention provides radio frequency identification devices, remote communication devices, wireless communication systems, and methods of indicating operation. According to a first aspect, a radio frequency identification device includes a substrate; communication circuitry coupled with the substrate and configured to receive wireless signals including spurious signals; and indication circuitry coupled with the communication circuitry and configured to output an indication signal to indicate reception of the spurious signals within the communication circuitry. Another aspect provides a method of indicating operation of a radio frequency identification device including providing a radio frequency identification device including communication circuitry and indication circuitry; receiving wireless signals including spurious signals using the communication circuitry; and emitting human perceptible signals using the indication circuitry to indicate the receiving spurious signals.

48 Claims, 5 Drawing Sheets

U.S. PATENT DOCUMENTS

| | | | |
|---|---|---|---|
| 5,119,069 A | 6/1992 | Heshkovitz et al. | 340/515 |
| 5,151,684 A | 9/1992 | Johnsen | 340/572.1 |
| 5,214,410 A | 5/1993 | Verster | 340/572.1 |
| 5,337,041 A | 8/1994 | Friedman | 340/573.1 |
| 5,416,486 A | 5/1995 | Koert et al. | 342/42 |
| 5,450,070 A | 9/1995 | Massar et al. | 340/825.49 |
| 5,539,393 A | 7/1996 | Barford | 340/825.52 |
| 5,550,547 A * | 8/1996 | Chan et al. | 342/42 |
| 5,565,858 A | 10/1996 | Guthrie | 340/10.33 |
| 5,570,080 A | 10/1996 | Inoue et al. | 340/571 |
| 5,581,257 A * | 12/1996 | Greene | 342/51 |
| 5,617,060 A | 4/1997 | Wilson et al. | 330/129 |
| 5,621,412 A | 4/1997 | Sharpe et al. | 342/51 |
| 5,649,295 A | 7/1997 | Shober et al. | 455/38.2 |
| 5,649,296 A | 7/1997 | MacLellan et al. | 455/38.2 |
| 5,652,569 A | 7/1997 | Gerstenberger et al. | 340/573.1 |
| 5,656,998 A | 8/1997 | Fujiuchi et al. | 340/571 |
| 5,686,902 A * | 11/1997 | Reis et al. | 340/825.54 |
| 5,689,240 A | 11/1997 | Traxler | 340/573.1 |
| 5,742,238 A | 4/1998 | Fox | 340/825.49 |
| 5,771,002 A | 6/1998 | Creek et al. | 340/539 |
| 5,777,561 A * | 7/1998 | Chieu et al. | 340/825.54 |
| 5,787,174 A * | 7/1998 | Tuttle | 380/23 |
| 5,796,351 A | 8/1998 | Yabuki | 340/825.69 |
| 5,841,770 A | 11/1998 | Snodgrass et al. | 370/346 |
| 5,850,181 A * | 12/1998 | Heinrich et al. | 340/572.1 |
| 5,861,817 A | 1/1999 | Palmer et al. | 340/5.91 |
| 5,874,902 A * | 2/1999 | Heinrich et al. | 340/825.54 |
| 5,905,429 A | 5/1999 | Hornstein et al. | 340/384.6 |
| 5,929,778 A | 7/1999 | Asama et al. | 340/10.1 |
| 5,939,981 A | 8/1999 | Renney | 340/539 |
| 5,940,006 A * | 8/1999 | MacLellan et al. | 340/825.54 |
| 5,949,328 A * | 9/1999 | Latty | 340/326 |
| 5,952,922 A | 9/1999 | Shober | 340/572.4 |
| 5,963,133 A | 10/1999 | Monjo | 340/572.1 |
| 5,963,177 A * | 10/1999 | Tuttle et al. | 343/872 |
| 5,966,082 A | 10/1999 | Cofino et al. | 340/10.1 |
| 5,988,510 A | 11/1999 | Tuttle et al. | 235/492 |
| 5,995,019 A * | 11/1999 | Chieu et al. | 340/825.54 |
| 6,008,727 A | 12/1999 | Want et al. | 340/572.1 |
| 6,023,610 A * | 2/2000 | Wood, Jr. | 455/101 |
| 6,024,485 A * | 2/2000 | Mish | 235/492 |
| 6,027,027 A | 2/2000 | Smithgall | 235/488 |
| 6,031,459 A * | 2/2000 | Lake | 340/572.8 |
| 6,052,062 A * | 4/2000 | Tuttle | 340/825.31 |
| 6,078,260 A | 6/2000 | Desch | 340/573.1 |
| 6,130,602 A | 10/2000 | O'Toole et al. | 340/10.33 |
| 6,130,623 A | 10/2000 | MacLellan et al. | 340/10.1 |
| 6,133,830 A | 10/2000 | D'Angelo et al. | 340/571 |
| 6,137,422 A | 10/2000 | Hahn et al. | 340/825.69 |
| 6,147,602 A * | 11/2000 | Bender | 340/568.1 |
| 6,184,789 B1 | 2/2001 | Richley et al. | 340/571 |
| 6,289,209 B1 | 9/2001 | Wood, Jr. | 455/277.1 |
| 6,236,889 B1 | 12/2001 | Van Horn et al. | 340/572.1 |
| 6,333,690 B1 | 12/2001 | Nelson et al. | 340/539 |

* cited by examiner

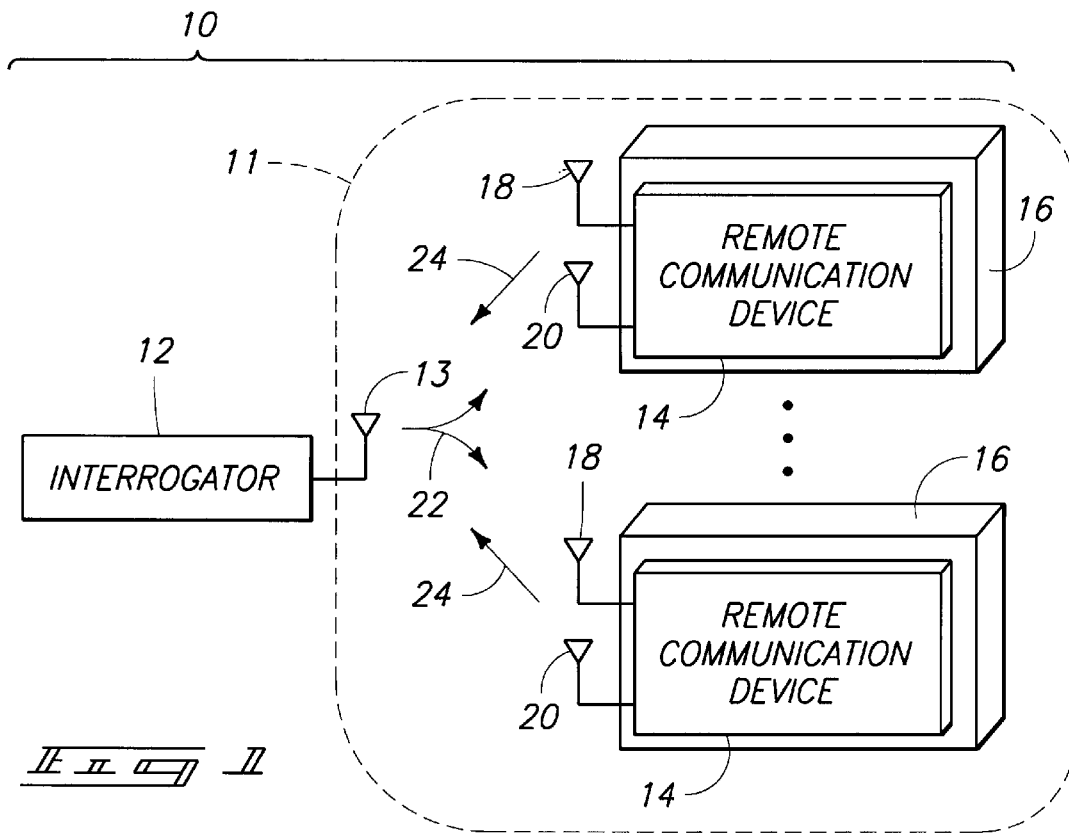
_Fig. 1_
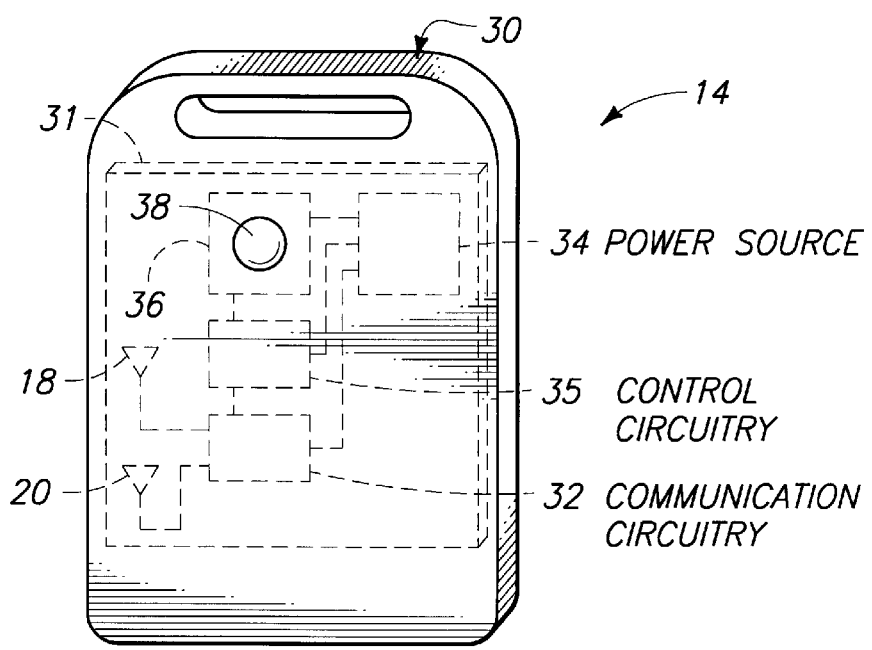
_Fig. 2_

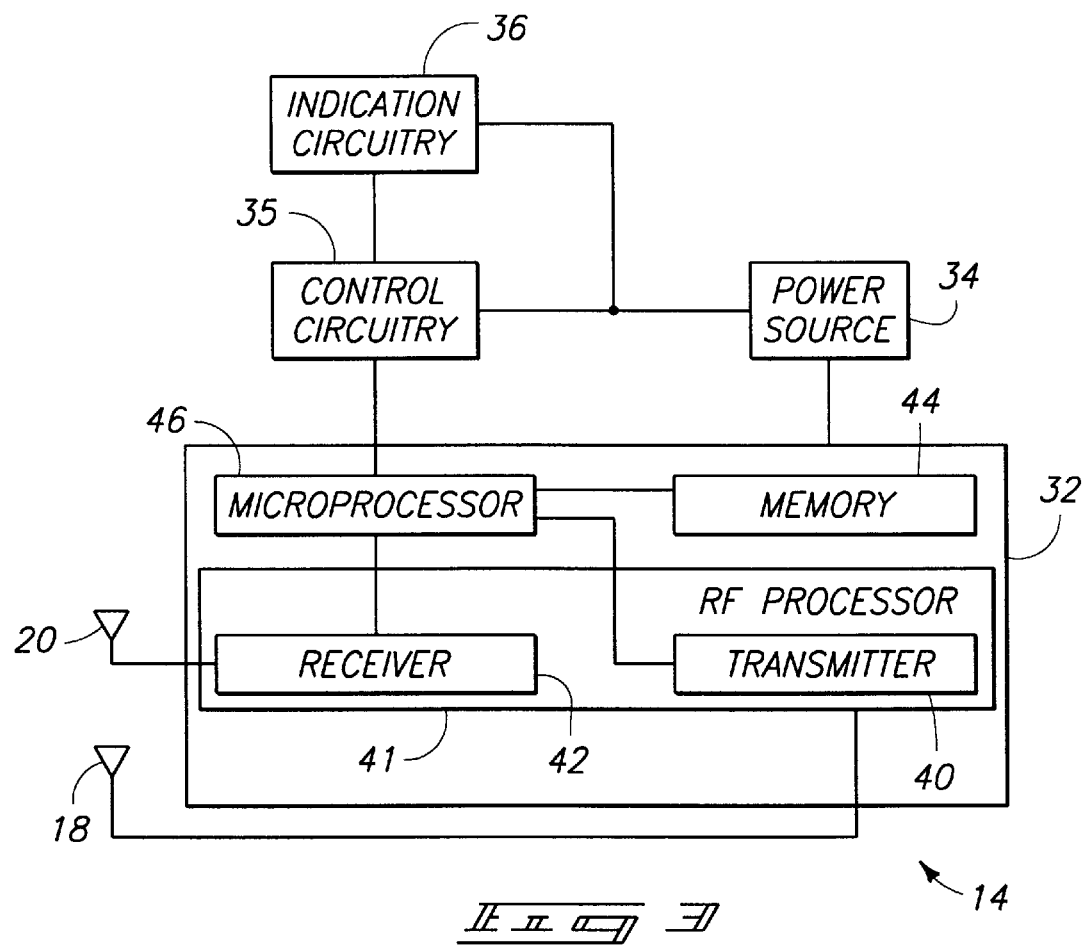
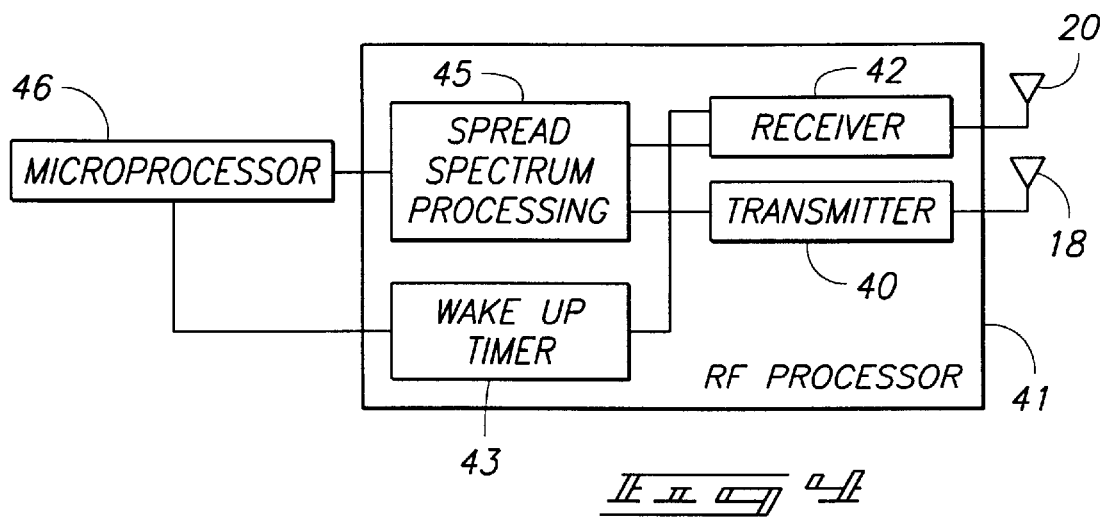

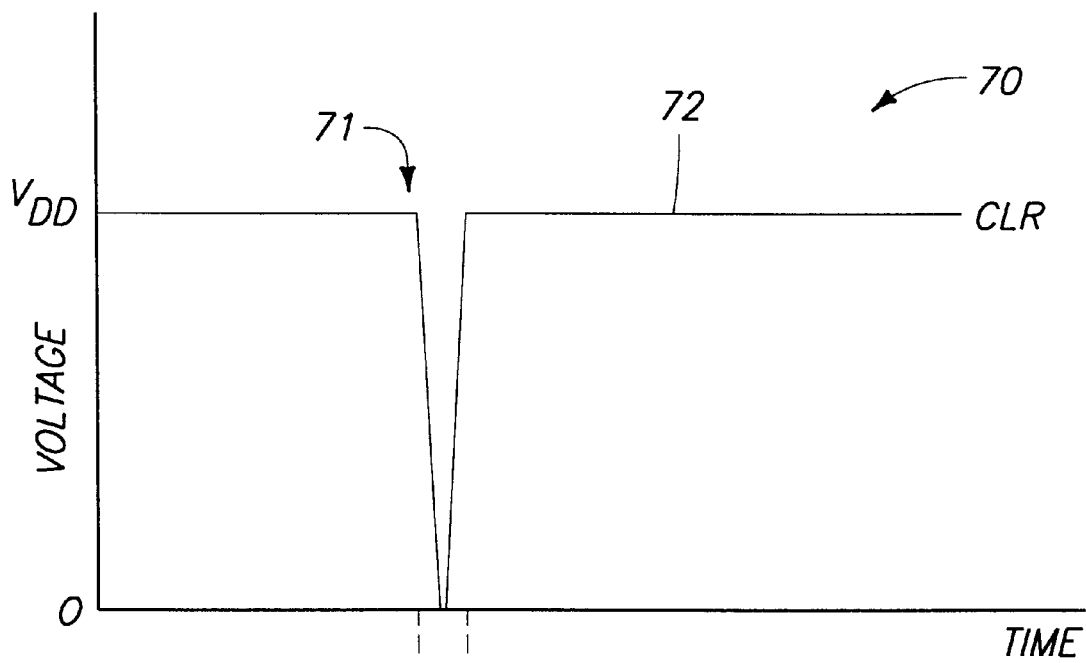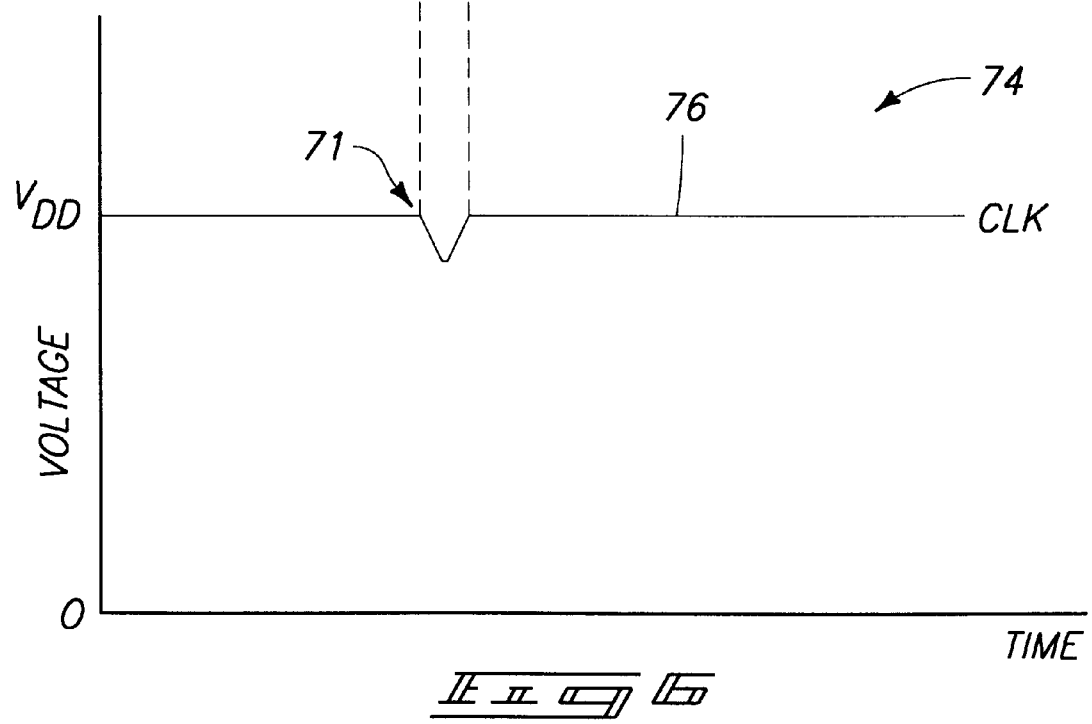

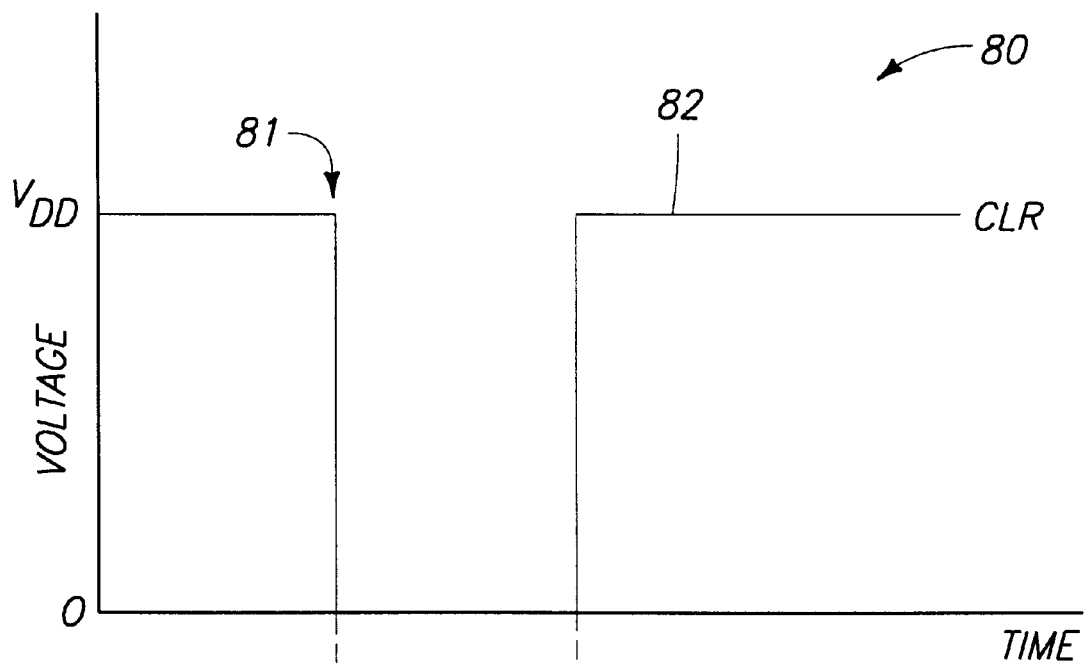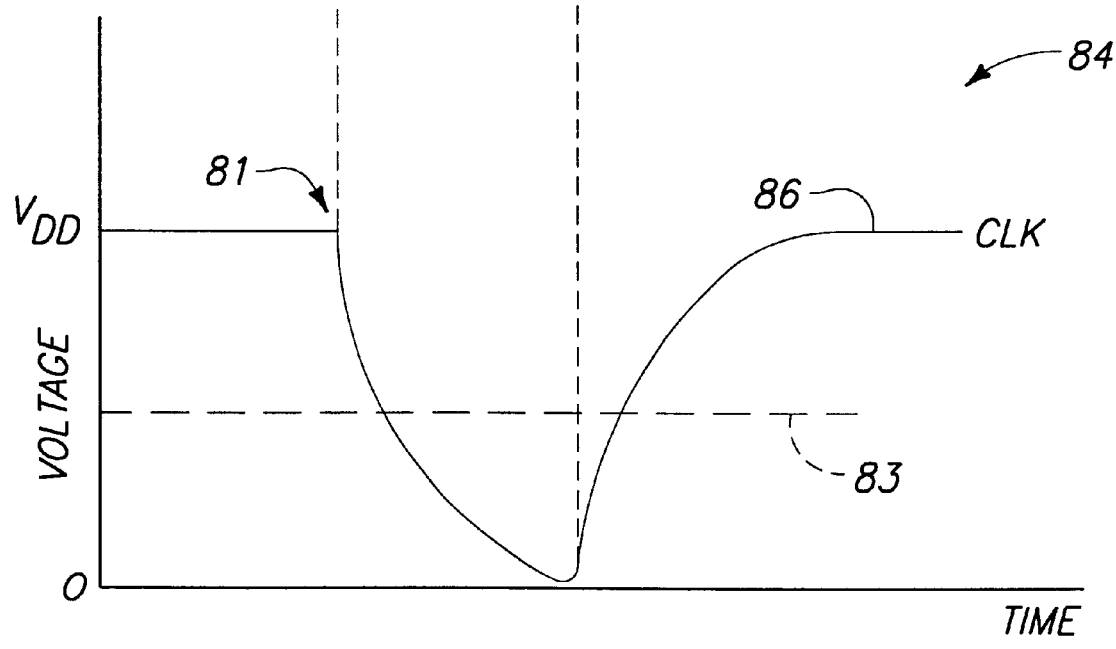
Fig. 7

RADIO FREQUENCY IDENTIFICATION DEVICES, REMOTE COMMUNICATION DEVICES, WIRELESS COMMUNICATION SYSTEMS, AND METHODS OF INDICATING OPERATION

TECHNICAL FIELD

This invention relates to radio frequency identification devices, remote communication devices, wireless communication systems, and methods of indicating operation.

BACKGROUND OF THE INVENTION

Wireless communication systems including electronic identification devices, such as radio frequency identification devices (RFIDs), are known in the art. Such devices are typically used for inventory tracking. As large numbers of objects are moved in inventory, product manufacturing, and merchandising operations, there is a continuous challenge to accurately monitor the location and flow of objects. Additionally, there is a continuing goal to determine the location of objects in an inexpensive and streamlined manner. One way of tracking objects is with an electronic identification system.

One presently available electronic identification system utilizes a magnetic coupling system. Typically, the devices are entirely passive (have no power supply), which results in a small and portable package. However, such identification systems are only capable of operation over a relatively short range, limited by the size of a magnetic field used to supply power to the devices and to communicate with the devices.

Another type of wireless communication system is an active wireless electronic identification system. Attention is directed towards commonly assigned U.S. patent application Ser. No. 08/705,043, filed Aug. 29, 1996, now U.S. Pat. No. 6,130,602, incorporated herein by reference, and which describes such active systems in detail.

These systems include integrated circuit devices which include an active transponder and are intended to be affixed to an object to be monitored. The devices are capable of receiving and processing instructions transmitted by an interrogator. A device receives the instruction, if within range, then processes the instruction and transmits a response, if appropriate. The interrogation signal and the responsive signal are typically radio-frequency (RF) signals produced by an RF transmitter circuit. Because active devices have their own power sources, such do not need to be in close proximity to an interrogator or reader to receive power via magnetic coupling. Therefore, active transponder devices tend to be more suitable for applications requiring tracking of a tagged device that may not be in close proximity to an interrogator. For example, active transponder devices tend to be more suitable for inventory control or tracking.

Radio frequency identification devices may be subjected to undesired signals in the field. For example, various electronic devices such as radar, microwave ovens, etc. can emit spurious radio frequency signals into a communication range of a wireless communication system. The presence of such spurious undesired signals can result in rapid consumption of power of batteries of radio frequency identification devices. This degrades available power of such batteries which could otherwise be used for providing communication operations.

SUMMARY OF THE INVENTION

This invention provides radio frequency identification devices, remote communication devices, wireless communication systems, and methods of indicating operation.

One aspect of the present invention provides a wireless communication system. The wireless communication system includes an interrogator and a radio frequency identification device. The interrogator is configured to output a forward link wireless signal. An exemplary forward link wireless signal includes an interrogation signal.

The radio frequency identification device includes communication circuitry configured to receive the forward link wireless signal and a spurious wireless signal. The radio frequency identification device further includes indication circuitry coupled with the communication circuitry and configured to indicate reception of the spurious wireless signal within the communication circuitry.

Exemplary indication circuitry includes circuitry operable to emit human perceptible signals. For example, indication circuitry can include an indicator comprising a light emitting device to emit a visually perceptible signal to indicate the reception of spurious wireless signals. Such indication using the indication circuitry can be subsequently utilized to implement actions to reduce the presence of spurious wireless signals. Other aspects are provided in the present invention.

BRIEF DESCRIPTION OF THE DRAWINGS

Preferred embodiments of the invention are described below with reference to the following accompanying drawings.

FIG. 1 is an illustrative diagram of an exemplary wireless communication system.

FIG. 2 is an isometric view of an exemplary remote communication device of the wireless communication system shown in FIG. 1.

FIG. 3 is a functional block diagram of exemplary internal circuitry of the remote communication device.

FIG. 4 is a functional block diagram of exemplary internal circuitry of a radio frequency processor of the remote communication device.

FIG. 6 includes graphs which illustrate first operations of the control circuitry.

FIG. 7 includes graphs which illustrate second operations of the control circuitry.

DETAILED DESCRIPTION OF THE PREFERRED EMBODIMENTS

Figure 5:
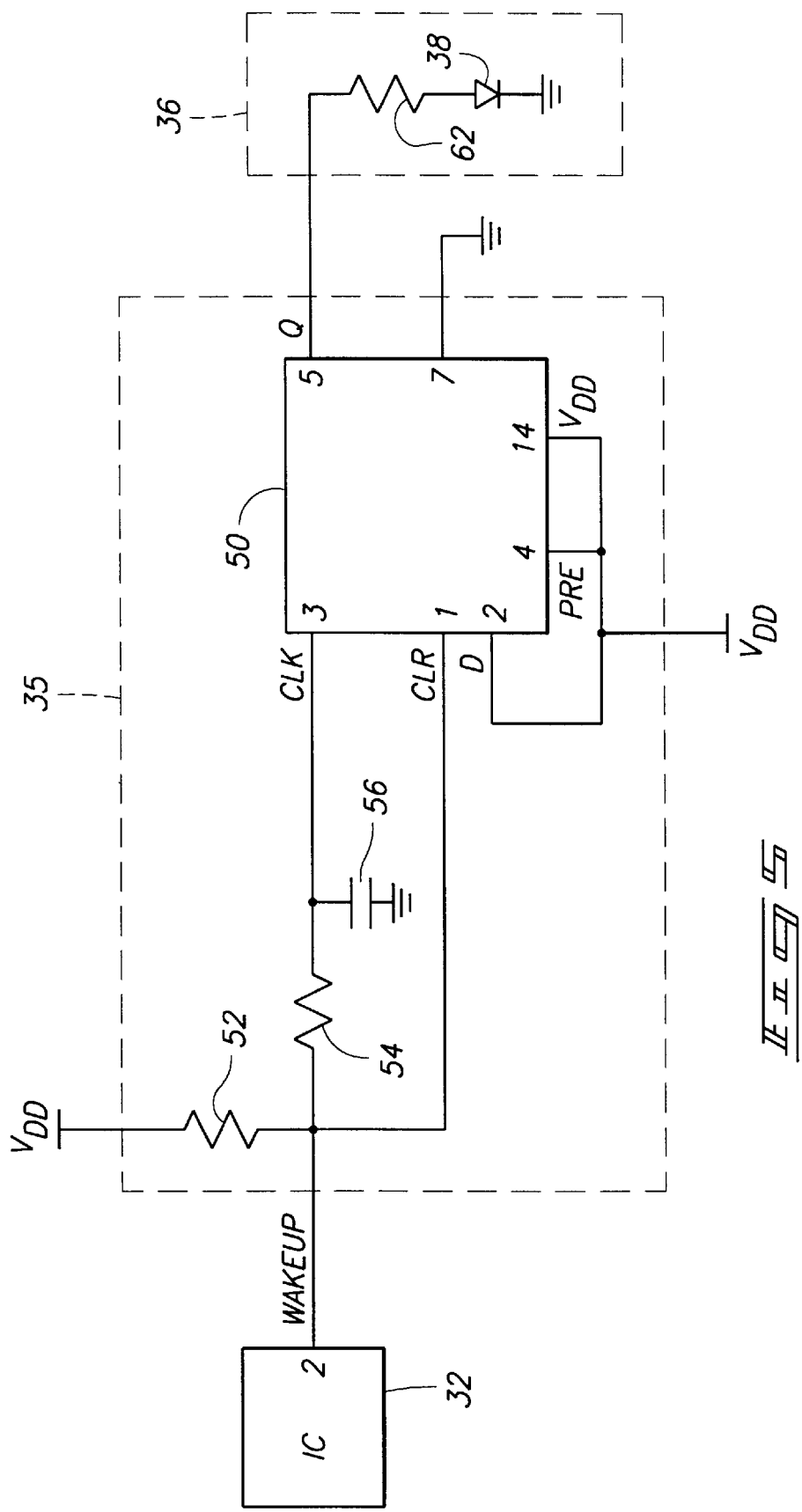
FIG. 5 is a functional block diagram of exemplary control circuitry and indication circuitry of the remote communication device.

This disclosure of the invention is submitted in furtherance of the constitutional purposes of the U.S. Patent Laws "to promote the progress of science and useful arts" (Article 1, Section 8).

Referring to FIG. 1, a wireless communication system 10 is illustrated in accordance with one embodiment of the invention. Wireless communication system 10 includes an interrogator 12 and at least one remote communication device 14. Typically, numerous remote communication devices 14 are provided within wireless communication system 10 although only two such remote communication devices 14 are illustrated in FIG. 1. The particular number of remote communication devices 14 which are in communication with interrogator 12 may change over time.

A communication range 11 of the illustrated interrogator 12 is shown in FIG. 1. During exemplary object monitoring operations, more or less remote communication devices 14 can be within communication range 11 of interrogator 12 as objects or packages are moved about. Interrogator 12 communicates with remote communication devices 14 located within communication range 11. Typically, there is no communication between multiple remote communication devices 14. Instead, remote communication devices 14 respectively communicate with interrogator 12. As previously mentioned, multiple remote communication devices 14 are typically used in the same field of interrogator 12 (i.e., within communications range 11 of interrogator 12).

In the described embodiment, wireless communication system 10 is configured as an electronic identification system. Other configurations of wireless communication system 10 are possible. Remote communication devices 14 can individually be associated with respective objects 16, such as packages in inventory. Wireless communication system 10 can also be used in other applications including, for example, other identification applications.

Remote communication devices 14 individually comprise a wireless identification device in the described configuration. Other configurations of remote communications devices 14 are possible. An exemplary wireless identification device is a radio frequency identification device (RFID). In the depicted arrangement, remote communication devices 14 individually include an antenna 18 for wireless or radio frequency transmission by the respective remote communication device 14. Remote communication devices 14 further individually include an antenna 20 for wireless or radio frequency reception by the respective remote communication device 14. In one embodiment, the antennas 18, 20 are microstrip antennas.

Individual remote communication devices 14 transmit and receive radio frequency communications to and from interrogator 12. An exemplary interrogator is described in commonly assigned U.S. patent application Ser. No. 08/907, 689, filed Aug. 8, 1997 and incorporated herein by reference. Preferably, interrogator 12 includes an antenna 13 as well as dedicated transmitting and receiving circuitry. In one embodiment, such circuitry is complementary to that implemented within individual remote communication devices 14.

Radio frequency identification has emerged as a viable system for tagging or labeling small to large quantities of objects 16. In the described configuration, interrogator 12 and remote communication devices 14 communicate via an electromagnetic link, such as via an RF link (e.g., at microwave frequencies, in one embodiment), so all transmissions by interrogator 12 are heard simultaneously by all remote communication devices 14 within communication range 11.

Interrogator 12 transmits forward link wireless signals 22 individually comprising an interrogation signal or command via antenna 13. An exemplary forward link wireless signal 22 includes a tag identifier, command, and data. The tag identifier can comprise an identifier to identify one or more of remote communication devices 14 in some applications. Typically, the remote communication devices 14 identified within tag identifier process the respective command and data.

Remote communication devices 14 within the appropriate communication range 11 individually receive the incoming interrogation forward link wireless signal 22 via respective antennas 20. Upon receiving wireless signal 22, individual ones of remote communication devices 14 can respond by generating and transmitting a responsive signal or return link communication signal 24 via respective antenna 18. The responsive signal 24 typically includes information that uniquely identifies, or labels the particular remote communication device 14 that is transmitting. Such may operate to identify a respective object 16 with which the responding remote communication device 14 is associated. Exemplary objects 16 include packages in inventory, people, automobiles, animals, etc.

Referring to FIG. 2, remote communication device 14 can be included in any appropriate packaging or housing 30. Various methods of manufacturing housings are described in commonly assigned U.S. patent application Ser. No. 08/800, 037, filed Feb. 13, 1997, now U.S. Pat. No. 5,988,150, and incorporated herein by reference. An exemplary housing 30 includes an ultrasonically welded plastic injection molded case. Housing 30 is provided about a substrate 31 and at least some of the circuitry (described below) of remote communication device 14. Housing 30 can be configured as a case about substrate 31 to enclose most if not all of the internal components of remote communication device 14. More specifically, circuitry of remote communication device 14 is provided upon substrate 31 in one embodiment. An exemplary substrate 31 is FR4 board. Circuit components of remote communication device 14 may be attached to substrate 31 using pick-and-place processing techniques.

FIG. 2 shows but one embodiment of remote communication device 14 in the form of a card or badge including housing 30 of plastic or other suitable material. In one embodiment, a face of housing 30 has visual identification features such as graphics, text, information found on identification or credit cards, etc. (not shown). Housing 30 can also be formed as a miniature housing encasing the internal circuitry and power supply 16 to define a tag which can be supported by object 16 (e.g., hung from an object, affixed to an object, etc.). Other forms of housings 30 are employed in alternative embodiments.

In the illustrated embodiment, remote communication device 14 includes communication circuitry 32, a power source 34, control circuitry 35 and indication circuitry 36. Communication circuitry 32 is defined by a small outline integrated circuit (SOIC) as described in the above-incorporated patent application Ser. No. 08/705,043, filed Aug. 29, 1996. Exemplary communication circuitry 32 is available from Micron Communications Inc., 3176 S. Denver Way, Boise, Id. 83705 under the trademark Microstamp Engine™ and having designations MSEM256X10SG, MT59RC256R1FG-5. Other embodiments of communication circuitry 32 are possible. Power source 34 is connected to supply power to communication circuitry 32, control circuitry 35 and indication circuitry 36.

In one embodiment, power source 34 comprises one or more batteries. Individual batteries can take any suitable form. Preferably, the battery type will be selected depending on weight, size, and life requirements for a particular application. In one embodiment, a suitable battery is a thin profile button-type cell forming a small, thin energy cell more commonly utilized in watches and small electronic devices requiring a thin profile. A conventional button-type cell has a pair of electrodes, an anode formed by one face and a cathode formed by an opposite face. In an alternative embodiment, power source 34 comprises a series connected pair of button type cells. In other alternative embodiments, other types of suitable power source are employed. Suitable batteries of power source 34 individually include a 3 Volt battery having designation CR2016 available from Eveready Battery Co. Two such batteries can be coupled in series for a 6 Volt output of power source 34 in one embodiment.

In the described arrangement, communication circuitry 32 is coupled with substrate 31 and is configured to at least one of receive wireless signals and communicate wireless signals. Exemplary received and communicated wireless signals comprise radio frequency signals as previously described. In one embodiment, communication circuitry 32 comprises transponder circuitry configured to output the reply or return link wireless identification signal 24 responsive to the reception of forward link wireless interrogation signal 22 generated within interrogator 12.

Control circuitry 35 is coupled with communication circuitry 32 and indication circuitry 36. In the described embodiment, indication circuitry 36 includes an indicator 38 to indicate operation of remote communication device 14. Remote communication device 14 can be configured such that indication circuitry 36 indicates reception of signals as described below. Indication circuitry 36 may also be configured to indicate other operations.

Exemplary additional indication operations of remote communication device 12 are described in a commonly assigned U.S. Patent Application entitled "Radio Frequency Identification Devices, Wireless Communication Systems, Communication Methods, Methods of Forming a Radio Frequency Identification Device, Methods of Testing Wireless Communication Operations, and Methods of Determining a Communication Range", naming Mark T. Van Horn, David K. Ovard and Scott T. Trosper as inventors, filed the same day as the present application, having attorney docket number M140-187, now U.S. patent application Ser. No. 09/363,944, and incorporated herein by reference, and in a commonly assigned U.S. patent application entitled "Radio Frequency Identification Devices, Remote Communication Devices, Identification Systems, Communication Methods, and Identification Methods", naming Scott T. Trosper as inventor, filed the same day as the present application, having attorney docket number M140-197, now U.S. patent application Ser. No. 09/364,249, and incorporated herein by reference.

Indication circuitry 36 includes indicator 38 configured to emit a human perceptible signal to indicate reception of signals within remote communication device 14 in accordance with a preferred configuration. In the described embodiment, indicator 38 is configured to visually indicate operation of remote communication device 14. In particular, indicator 38 can include at least one light emitting device, such as a light emitting diode (LED), to emit a visually perceptible signal to humans. Indication circuitry 36 can also include other indicators 38 for indicating operation of remote communication device 14. Another exemplary configuration of indicator 38 includes an audible device, such as a buzzer. Indicator 38 can have other configurations.

Preferably, remote communication device 14 is configured such that indicator 38 of indication circuitry 36 outwardly emits the human perceptible signal or otherwise indicates operation outside of housing 30. For example, indicator 38 may extend through housing 30 as shown and is externally visible. In the depicted arrangement, housing 30 is provided about substrate 31 and internal circuitry with indication circuitry 36 at least partially outwardly exposed as illustrated.

Referring to FIG. 3, communication circuitry 32 of remote 11 communication device 14 implemented as a single die in accordance with the described embodiment includes a radio frequency (RF) processor 41, a memory 44, and a microprocessor 46. The depicted radio frequency processor 41 includes a transmitter 40 and a receiver 42. Microprocessor 46 is coupled to transmitter 40, receiver 42, and memory 44 as is described in U.S. patent application Ser. No. 08/705,043. Forward link wireless signals 22 are received within antenna 20 and applied to receiver 42. In one configuration, transmitter 40 is configured to reply via antenna 18 using backscatter communications. Forward link wireless signals 22 can be specific to individual remote communication devices 14, or intended to apply to some or all remote communication devices 14 within communication range 11.

Microprocessor 46 is configured to process the signals received by receiver 42. Responsive to the content of a received forward link wireless signal 22, microprocessor 46 can formulate return link wireless signal 24 which is applied to transmitter 40. Transmitter 40 operates to output return link wireless signals 24 using antenna 18. As previously described, transmitter 40 may be configured for backscatter communications. For example, antenna 18 can be configured as a dipole antenna and transmitter 40 can selectively short halves of the dipole antenna configuration to selectively reflect a continuous wave signal generated by interrogator 12.

Referring to FIG. 4, additional details of radio frequency processor 41 are described. For example, RF processor 41 of communication circuitry 32 additionally includes a wake up timer circuit 43 and a spread spectrum processing circuit 45. In one my embodiment, remote communication devices 14 individually switch between a "sleep" mode of operation, and a higher power mode of operation referred to as a "wake" mode. Such switching is utilized to conserve energy and extend the life of power source 34 during periods of time when no forward link wireless signals 22 are received by remote communication devices 14.

According to one embodiment, switching between the sleep mode and the wake mode is implemented using the wake up timer circuitry 43. During ideal operation conditions, remote communication device 14 enters the sleep mode when no forward link wireless signals 22 are detected from interrogator 12. Thereafter, remote communication device 14 monitors for the presence of forward link wireless signals 22 during the sleep mode.

In one configuration, wake up timer 43 periodically asserts a WAKEUP signal every 16 ms using timing circuitry (not shown). The WAKEUP signal is applied to microprocessor 46 and receiver 42. Microprocessor 46 monitors for the presence of a forward link wireless signal 22 via receiver 42 responsive to the WAKEUP signal. Remote communication device 14 remains in the sleep mode responsive to no forward link wireless signal 22 being present.

Alternatively, remote communication device 14 enters a wake mode responsive to the presence of a forward link wireless signal 22 within receiver 42. The forward link wireless signal 22 is subsequently analyzed and return link wireless signal 24 (of FIG. 1) may be generated if appropriate. Thereafter, remote communication device 14 continues to monitor for the presence of forward link wireless signals 22 (of FIG. 1) and may enter the sleep mode again to conserve power if none are detected.

Spread spectrum processing circuit 40 is included in communication circuitry 32 in the described embodiment. In this configuration, signals transmitted and received by interrogator 12 and signals transmitted and received by remote communication device 14 are modulated spread spectrum signals. Such modulation techniques are advantageous where there are multiple users, as is the case with the preferred radio frequency identification wireless communication system 10 of the present invention including plural remote communication devices 14.

The spread spectrum modulation technique of the illustrated embodiment is advantageous because the forward link wireless signal 22 and return link wireless signal 24 can be individually distinguished from other spurious signals (e.g., radar, microwave ovens, etc.) operating at similar frequencies. The spread spectrum signals transmitted by interrogator 12 and remote communication device 14 are pseudo-random and have noise-like properties when compared with the command or reply signals. The illustrated embodiment employs direct sequence spread spectrum (DSSS) modulation. Other modulation schemes or techniques are possible.

Wireless communication system 10 may be subjected to spurious wireless signals during communication operations. Such spurious wireless signals can include radar signals, signals from microwave ovens, etc. operating at similar frequencies. Accordingly, during moments in time when remote communication 14 is operating in the sleep mode, some spurious signals may be received within the approximate frequency range of communications (e.g., 2.4 GHz) of wireless communication system 10.

More specifically, once the WAKEUP signal is asserted by wake up timer 43, microprocessor 46 analyzes wireless signals received by antenna 20 and receiver 42. Such received wireless signals can include undesired spurious wireless signals as well as desired forward link wireless signals 22. Accordingly, microprocessor 46 processes the received wireless signals to distinguish spurious wireless signals from forward link wireless signals 22.

In the described embodiment, microprocessor 46 searches for a pseudo-random sequence within the received wireless signals. Wake up timer circuit 43 asserts the WAKEUP signal during the modulation processing (e.g., searching for an appropriate pseudo-random sequence). Signals containing appropriate pseudo-random sequences comprise forward link wireless signals 22 as identified by microprocessor 46 while spurious wireless signals will also be identified and may be discarded. Thereafter, microprocessor 46 processes forward link wireless signals 22 (e.g., processes identifiers and commands, etc.). Additionally, microprocessor 46 can enter the sleep mode following the detection of spurious wireless signals. The additional processing of such spurious signals to determine whether an appropriate pseudo-random sequence is present consumes additional power thereby depleting power source 34.

Referring again to FIG. 3, it is beneficial to indicate the reception of spurious signals within remote communication device 14 which may lead to a shortened life of power source 34. Once it is realized such spurious signals are present, steps may be taken to eliminate or minimize the presence of such spurious signals.

Indication circuitry 36 coupled with communication circuitry 32 is preferably configured to output an indication signal to indicate reception of such spurious signals within communication circuitry 32. As previously mentioned, indication circuitry 36 may be configured to emit a human perceptible signal to indicate the reception of spurious signals. More specifically, indicator 38 (shown in FIG. 2) can comprise a light-emitting device configured to emit a signal which is visible to humans to indicate the reception of spurious signals.

Communication circuitry 32 periodically monitors for the reception of wireless signals via antenna 20 and receiver 42. A periodic assertion of the WAKEUP signal by wake up timer 43 implements such periodic monitoring operations. Microprocessor 46 is configured to process signals outputted from spread spectrum processing circuitry 45 to determine whether appropriate pseudo-random sequences are present, and thus whether the received signals comprise spurious signals or forward link wireless signals 22.

The WAKEUP signal is asserted during such processing of received wireless signals. Control circuitry 35 is coupled with communication circuitry 32 and is configured to monitor the WAKEUP signal. More specifically, control circuitry 35 generates a control signal responsive to the WAKEUP signal being asserted for a predetermined period of time.

Indication circuitry 36 is coupled with control circuitry 35 and is configured to indicate the reception of wireless signals using indicator 38 responsive to the control signal being asserted by control circuitry 35. Such indication by indication circuitry 36 can be utilized to indicate the presence of spurious signals.

In effect, control circuitry 35 controls the indication by indication circuitry 36 responsive to the WAKEUP signal from communication circuitry 32 being asserted for a predetermined period of time as described in further detail below. Communication circuitry 32 maintains the assertion of the WAKEUP signal during the processing of received wireless signals. Indication circuitry 36 indicates maintenance of the WAKEUP signal in the asserted state following such assertion for a predetermined length of time.

Referring to FIG. 5, one configuration of control circuitry 35 and indication circuitry 36 is illustrated. The depicted control circuitry 35 includes a latch 50, plural resistors 52, 54 and capacitor 56 arranged as shown. Indication circuitry 36 includes a resistor 62 coupled with indicator 38 in the illustrated arrangement. Resistor 52 is a 10 kΩ resistor, resistor 54 is a 100 kΩ resistor and capacitor 56 is a 1,000 pF capacitor in the described configuration of control circuitry 35. Resistor 62 is a 10 kΩ potentiometer and indicator 38 is a light emitting diode (LED) in the depicted configuration of indication circuitry 36.

Latch 50 comprises a D-type positive edge triggered flip-flop with clear and preset in the described configuration. A suitable latch 50 has designation 74HC74 and is available from Texas Instruments. As shown, a D input pin 2, a preset (PRE) input pin 4 and a $V_{DD}$ input pin 14 all of latch 50 are individually coupled with a $V_{DD}$ supply of power source 34.

The WAKEUP signal asserted within communication circuitry 32 is applied to control circuitry 35. A clear (CLR) pin 1 and clock (CLK) pin 3 of latch 50 are coupled with a pin 2 of communication circuitry 32 which outputs the WAKEUP signal. The depicted control circuitry 35 comprises a filter configured to selectively remove the WAKEUP signal if it is asserted for less than a predetermined period of time before application to indication circuitry 36.

The WAKEUP signal is typically asserted for approximately 25 µs in the described embodiment if no wireless signals are received within receiver 42. The assertion of the WAKEUP signal by communication for 25 µs circuitry 32 does not inject a rising edge to latch 50. Thus, the Q output of latch 50 remains in a logic low state and indicator 38 is not illuminated.

However, during the reception of wireless signals (e.g., forward link wireless signals 22 and spurious wireless signals) the WAKEUP signal is typically asserted for an extended period of time corresponding to processing of the received signals using microprocessor 46. The WAKEUP signal may be asserted for approximately 0.5 ms–3 ms responsive to a wireless signal being received via antenna 20 and receiver 42 in the described embodiment. Such assertion is longer than a predetermined length of time as determined by resistor 54 and capacitor 56 in the depicted arrangement and a rising edge is applied to the clock input of latch 50. Such results in the Q output of latch 50 going to a logic high state and the illumination of LED indicator 38.

Accordingly, control circuitry 35 and indication circuitry 36 indicate the presence of wireless signals including spurious signals within remote communication device 14. Further, control circuitry 35 operates to selectively filter signals outputted from communication circuitry 32 which are shorter in duration than a predetermined length of time.

Referring to FIG. 6, graphs 70, 74 are depicted which illustrate the operation of control circuitry 35 wherein no wireless signals are received within remote communication device 14. Voltage is represented in the vertical direction in graphs 70, 74 and time is represented in the horizontal direction in graphs 70, 74. Graph 70 illustrates the clear (CLR) signal applied to latch 50 as represented by line 72. Graph 74 represents the clock (CLK) signal applied to latch 50 as represented by line 76.

At a moment in time 71 within graph 70, the clear signal is asserted corresponding to the periodic assertion of the WAKEUP signal from communication circuitry 32. As illustrated in graph 74, the clock signal has a slight dip as represented by line 76 corresponding to the assertion of the WAKEUP signal subsequent to moment in time 71. However, the slight dip at moment in time 71 of the clock signal is insufficient to provide a positive edge to trigger latch 50. Accordingly, the Q output of latch 50 stays at a logic low state and control circuitry 35 operates as a filter.

Referring to FIG. 7, plural graphs 80, 84 are shown. Voltage is represented in the vertical direction in graphs 80, 84 and time is represented in the horizontal direction in graphs 80, 84. The clear (CLR) signal applied to latch 50 is represented by line 82 and the clock (CLK) signal applied to latch 50 is represented by line 86. Graphs 80, 84 represent a situation wherein a wireless signal is received within antenna 20 and receiver 42.

At a moment in time 81, the WAKEUP signal outputted from communication circuitry 32 is asserted for an extended length of time corresponding to processing of the received wireless signal by microprocessor 46. As represented by line 86, the clock signal falls below a threshold 83 responsive to the WAKEUP signal being asserted for at least the predetermined length of time.

As further represented by line 86, the clock signal dropping below the threshold 83 is sufficient to provide a rising edge to the clock input to trigger latch 50. Accordingly, the Q output of latch 50 goes to a logic high state and the LED indicator 38 is illuminated within the depicted indication circuitry 36 to indicate the reception of a wireless signal within remote communication device 14.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A radio frequency identification device comprising:
   a substrate;
   communication circuitry coupled with the substrate and configured to receive wireless signals including spurious signals; and
   indication circuitry coupled with the communication circuitry and configured to output an indication signal to indicate reception of the spurious signals within the communication circuitry.

2. The radio frequency identification device according to claim 1 wherein the indication circuitry is configured to emit a human perceptible signal to indicate the reception.

3. The radio frequency identification device according to claim 1 wherein the indication circuitry includes a light emitting device configured to emit a human visible signal to indicate the reception.

4. The radio frequency identification device according to claim 1 wherein the communication circuitry is configured to periodically monitor for the reception of wireless signals.

5. The radio frequency identification device according to claim 1 wherein the control circuitry comprises a latch.

6. The radio frequency identification device according to claim 1 wherein the communication circuitry is configured to search for a pseudo-random sequence of individual received wireless signals.

7. A remote communication device comprising:
   a substrate;
   communication circuitry coupled with the substrate and configured to receive a wireless signal, to process the wireless signal, and to assert a first signal during the processing of the wireless signal;
   control circuitry coupled with the communication circuitry and configured to monitor the first signal, and to selectively generate a second signal responsive to the first signal being asserted for a predetermined period of time; and
   indication circuitry coupled with the control circuitry and configured to indicate reception of the wireless signal responsive to the second signal.

8. The remote communication device according to claim 7 wherein the indication circuitry is configured to emit a human perceptible signal to indicate the reception.

9. The remote communication device according to claim 7 wherein the communication circuitry is configured to periodically monitor for the reception of a wireless signal.

10. The remote communication device according to claim 7 wherein the indication circuitry is configured to indicate the reception of the wireless signal including a spurious signal.

11. The remote communication device according to claim 7 wherein the control circuitry comprises a filter configured to selectively remove the first signal if it is asserted for less than the predetermined period of time.

12. The remote communication device according to claim 7 wherein the communication circuitry comprises radio frequency identification device circuitry.

13. The remote communication device according to claim 7 wherein the control circuitry comprises a latch.

14. A radio frequency identification device comprising:
   a substrate;
   communication circuitry coupled with the substrate and configured to receive wireless signals including spurious signals, to process at least some of the received wireless signals, and to assert signals responsive to the processing of the wireless signals received within the communication circuitry; and
   indication circuitry coupled with the communication circuitry and configured to emit human perceptible signals indicating reception of the spurious signals responsive to the assertion of the signals by the communication circuitry.

15. The radio frequency identification device according to claim 14 wherein the indication circuitry is configured to emit human visible signals to indicate the reception.

16. The radio frequency identification device according to claim 14 wherein the communication circuitry is configured to periodically monitor for the reception of wireless signals.

17. The radio frequency identification device according to claim 14 further comprising control circuitry configured to control the outputting of the human perceptible signals responsive to the signals from the communication circuitry being asserted for a predetermined period of time.

18. A wireless communication system comprising:
   an interrogator configured to output a forward link wireless signal; and
   a radio frequency identification device including:
      communication circuitry configured to receive the forward link wireless signal and a spurious wireless signal; and
      indication circuitry coupled with the communication circuitry and configured to indicate reception of the spurious wireless signal within the communication circuitry.

19. The wireless communication system according to claim 18 wherein the indication circuitry is configured to emit a human perceptible signal to indicate the reception.

20. The wireless communication system according to claim 18 wherein the indication circuitry includes a light emitting device configured to emit a human visible signal to indicate the reception.

21. A method of indicating operation of a radio frequency identification device comprising:
   providing a radio frequency identification device including communication circuitry and indication circuitry;
   receiving wireless signals including spurious signals using the communication circuitry; and
   emitting human perceptible signals using the indication circuitry to indicate the receiving spurious signals.

22. The method according to claim 21 wherein the emitting includes emitting human visible signals.

23. The method according to claim 21 further comprising processing the wireless signals using the communication circuitry and the emitting is responsive to the processing.

24. The method according to claim 23 wherein the processing comprises searching for pseudo-random sequences of the wireless signals.

25. A method of indicating operation of a radio frequency identification device comprising:
   providing a radio frequency identification device;
   receiving wireless signals including spurious signals within the radio frequency identification device;
   processing the wireless signals after the receiving using the radio frequency identification device; and
   indicating the receiving of spurious signals using the radio frequency identification device.

26. The method according to claim 25 wherein the indicating includes emitting a human perceptible signal.

27. The method according to claim 25 wherein the indicating includes emitting a human visible signal.

28. The method according to claim 25 wherein the indicating is responsive to the processing occurring for a predetermined period of time.

29. The method according to claim 25 wherein the processing comprises searching for pseudo-random sequences of the wireless signals.

30. A method of indicating operation of a remote communication device comprising:
   providing a remote communication device;
   receiving a wireless signal within the remote communication device;
   processing the wireless signal after the receiving using the remote communication device;
   asserting a signal during the processing using the remote communication device; and
   indicating the receiving using the remote communication device responsive to the asserting occurring for a predetermined period of time.

31. The method according to claim 30 wherein the indicating includes emitting a human perceptible signal.

32. The method according to claim 30 wherein the indicating includes emitting a human visible signal.

33. The method according to claim 30 further comprising periodically asserting the signal.

34. The method according to claim 30 further comprising filtering the asserted signal.

35. The method according to claim 30 wherein the receiving includes receiving the wireless signal including a spurious signal and the indicating includes indicating the receiving the spurious signal.

36. The method according to claim 30 wherein the providing includes providing a radio frequency identification device.

37. A method of indicating operation of a remote communication device comprising:
   providing a remote communication device;
   receiving a wireless signal within the remote communication device;
   asserting a signal to monitor for the presence of the wireless signal within the remote communication device;
   processing the wireless signal using the remote communication device;
   maintaining the asserting during the processing; and
   indicating the maintaining using the remote communication device.

38. The method according to claim 37 wherein the indicating includes emitting a human perceptible signal.

39. The method according to claim 37 wherein the indicating includes emitting a human visible signal.

40. The method according to claim 37 further comprising periodically asserting the signal.

41. The method according to claim 37 further comprising filtering the asserted signal.

42. The method according to claim 37 wherein the receiving includes receiving the wireless signal including a spurious signal and the indicating includes indicating the receiving the spurious signal.

43. The method according to claim 37 wherein the providing includes providing a radio frequency identification device.

44. A method of indicating operation of a wireless communication system comprising:
   providing an interrogator and a radio frequency identification device;
   outputting a forward link wireless signal using the interrogator;
   receiving the forward link wireless signal within the radio frequency identification device;
   receiving spurious wireless signals within the radio frequency identification device; and
   indicating the receiving of the spurious wireless signals using the radio frequency identification device.

45. The method according to claim 44 wherein the indicating includes emitting a human perceptible signal.

46. The method according to claim 44 wherein the indicating includes emitting a human visible signal.

47. The method according to claim 44 further comprising processing the forward link wireless signal and the spurious wireless signal and the indicating being responsive to the processing.

48. A method of indicating operation of a wireless communication system comprising:

provding an interrogator and a radio frequency identification device;

outputting a forward link wireless signal using the interrogator;

receiving the forward link wireless signal within the radio frequency identification device;

receiving a spurious wireless signal within the radio frequency identification device;

asserting plural periodic signals to monitor for the presence of the forward link wireless signal within the radio frequency identification device;

processing the received forward link wireless signal and the received spurious wireless signal using the radio frequency identification device after the respective assertings;

maintaining the asserting of an individual one of the periodic signals during the processing;

filtering the asserted signals to remove asserted signals which are asserted for less than a predetermined length of time; and emitting a human visible signal using the radio frequency identification device indicating the receiving of the spurious wireless signal after the filtering.

* * * * *

UNITED STATES PATENT AND TRADEMARK OFFICE
CERTIFICATE OF CORRECTION

PATENT NO.    : 6,459,376 B2
DATED         : October 1, 2002
INVENTOR(S)   : Scott T. Trosper It is certified that error appears in the above-identified patent and that said Letters Patent is hereby corrected as shown below:

Column 5,
Line 60, please delete "11" after "remote".

Column 6,
Line 25, please delete "my" after "one".

Signed and Sealed this

Third Day of June, 2003

JAMES E. ROGAN
*Director of the United States Patent and Trademark Office*